Dec. 30, 1969     M. SKLAROFF     3,487,307
DIGITAL FLOWMETER
Original Filed Jan. 18, 1965     2 Sheets-Sheet 1
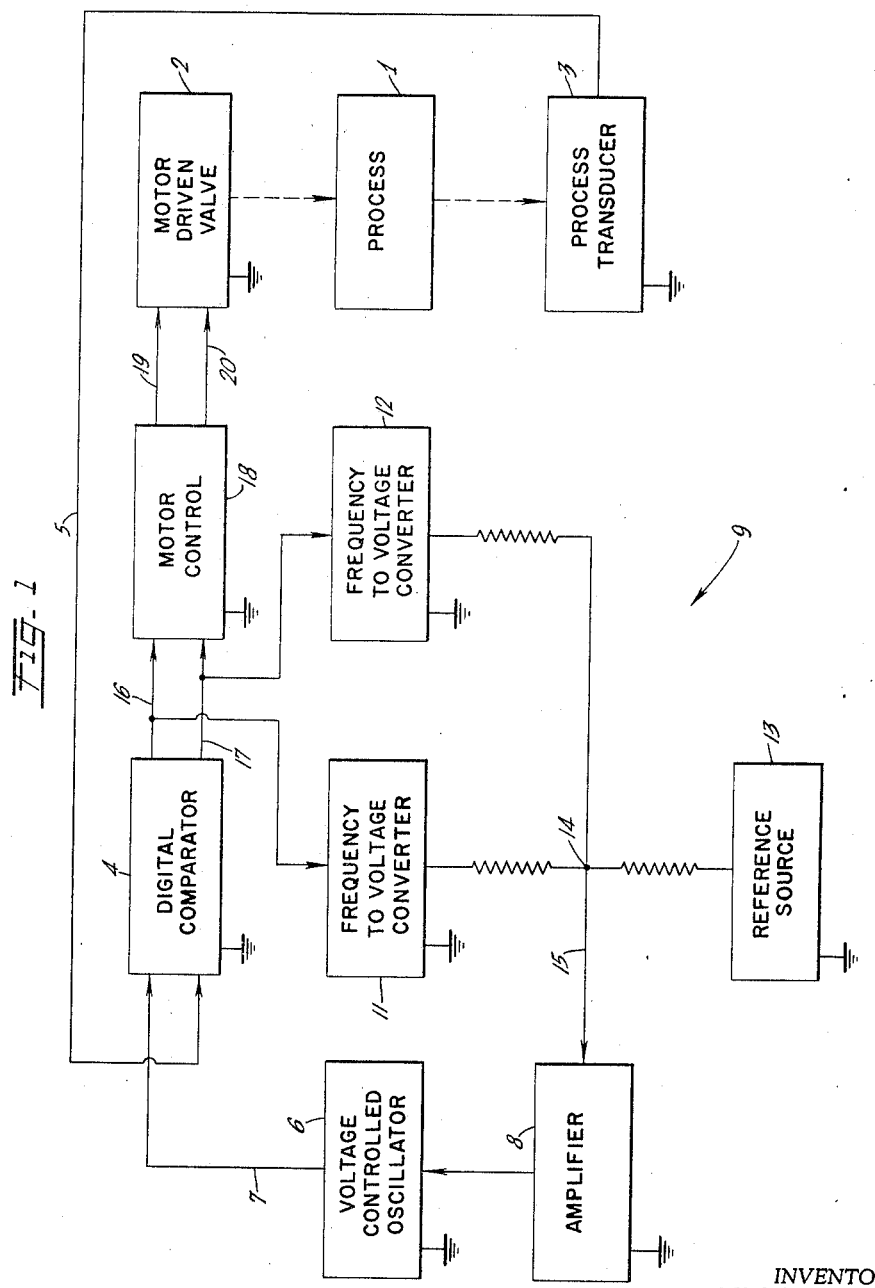
INVENTOR.
MORTON SKLAROFF
BY
ATTORNEY

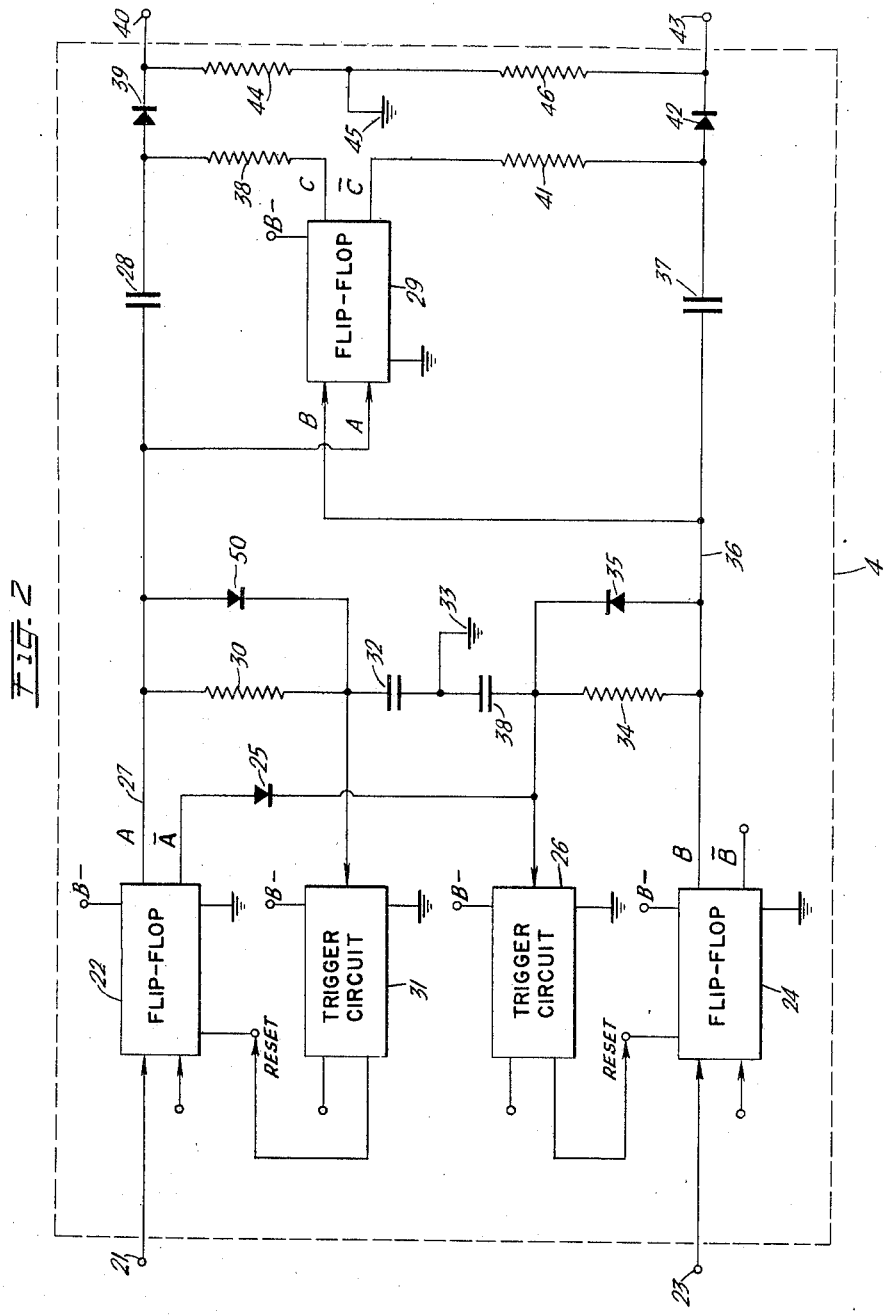

United States Patent Office 3,487,307
Patented Dec. 30, 1969

3,487,307
DIGITAL FLOWMETER
Morton Sklaroff, Philadelphia, Pa., assignor to Honeywell Inc., Minneapolis, Minn., a corporation of Delaware
Original application Jan. 18, 1965, Ser. No. 426,019, now Patent No. 3,427,442. Divided and this application July 1, 1968, Ser. No. 741,552
Int. Cl. H03b 3/04
U.S. Cl. 328—134   7 Claims

ABSTRACT OF THE DISCLOSURE

There is provided a digital comparison circuit which provides digital output signals in proportion to the difference between digital input signals.

This is a division of the copending application bearing Ser. No. 426,019, and filed on Jan. 18, 1965, now U.S. Patent No. 3,427,442.

In many control systems, digital signals are utilized to represent conditions existing in the physical system being controlled. These signals are operated upon to produce other representations or information which is supplied to the physical system. Frequently, it is necessary to determine the relationship of the signals being utilized. For instance, it may be useful to compare a digital signal representative of the physical system with a reference signal. The instant digital comparators can accomplish this function.

Consequently, one object of the present invention is to provide an improved digital control system for direct and continuous control of an operating process.

Another object of this invention is to provide an improved direct digital control system for effecting set-point control of a process by correcting set-point deviations in either direction and stabilizing at the set-point level.

Another object of this invention is to provide an improved digital control system having a digital comparator for comparing digital input signals and providing a digital output signal representative of the difference in the compared signals and characterized by the direction of the sensed difference.

Another object of this invention is to provide a digital control system having simplified operation and construction.

In accomplishing these and other objects, there has been provided, in accordance with the present invention, a digital control system for determining the effective status of a process control device in order to affect a process by correcting a set-point deviation of the control device. Typically, the system can be used to control a flow in a process by comparing a frequency signal representative of a set-point level with a frequency signal derived from the state of the controlled process. A deviation from the set-point level is effective to produce a frequency output signal from the comparator representative of the frequency difference between the compared signals and on a respective comparator output line corresponding to the direction of the set-point deviation. A voltage-controlled oscillator is used to provide the set-point frequency in response to the combined effects of a reference source and a voltage signal representative of the frequency of the output signal from the comparator to provide a rapid correction for a large error and a decreasing rate of correction as the set-point level is approached with a stabilization at the desired level.

A better understanding of the present invention may be had when the following detailed specification is read in connection with the accompanying drawings, in which:

FIG. 1 is a block diagram of a digital control system including a digital comparator, and
FIG. 2 is a schematic illustration of a novel digital comparator.

Referring to FIG. 1 in more detail, there is shown a digital flow control system for controlling a flow in a process 1 by means of a driven valve 2. Typically, valve 2 may be driven by a suitable stepping motor. Process transducer 3 is arranged to sense the flow or some other variable in the process 1 and to produce a variable frequency output signal representative of the magnitude of the sensed variable. This output signal is applied to digital comparator 4 along line 5 to be compared with a set-point, or reference signal. The set-point signal is obtained from voltage-controlled oscillator 6 along line 7. Oscillator 6 is controlled by an output signal from amplifier 8. The input signal for amplifier 8 is provided by flow error control circuit 9. Control circuit 9 comprises a first digital, or frequency, to voltage converter 11, a second digital, or frequency, to voltage converter 12 and reference signal source 13. The output signals from the first and second converters 11 and 12 and source 13 are combined at junction 14 and are applied along line 15 as an input signal to amplifier 8. The input signals for the converters 11 and 12 are obtained from comparator 4.

Comparator 4 is effective to compare the frequencies of the input signals on lines 5 and 7 and to produce a variable frequency output signal on one of two output lines 16 and 17 representative of the difference in the frequencies of the input signals applied to comparator 4. A suitable circuit for comparator 4 is shown in FIG. 2 and is described hereinafter. Output lines 16 and 17 are both connected to motor control circuit 18. In addition converters 11 and 12, respectively, are connected to separate ones of the output lines. Motor control circuit 18 is arranged to amplify the input signals supplied thereto via either of lines 16 and 17 and to apply an amplified signal to motorized valve 2 on a respective one of a pair of output lines 19 and 20. The signals on lines 19 and 20 are effective to drive motorized valve 2 in a corresponding direction.

In operation, the system shown in FIG. 1 is operative to control a flow in the process 1 by selective control of motorized valve 2. For example, in an initial state when the system is turned on, the output frequency from oscillator 6 is determined by the signal from reference source 13. Assuming the flow in the process 1 is to be increased, the comparator 4 is effective to produce an output signal which indicates that the frequency of the set-point level is greater than the frequency of the signal from transducer 3. This output signal is arranged to be applied on line 16, hereinafter referred to as the "up" line 16. Conversely, a desired decrease in the flow would produce an output signal on line 17, referred to as the "down" line 17. The output signal on "up" line 16 is applied to motor control 18 to produce a corresponding output signal on output line 19 to open valve 2. Similarly, the output signal on "down" line 17 would produce a signal on line 20 to close valve 2. The desired changes in flow may result either from disturbances in the process 1 which upset the flow relative to the set-point level or as a result of a change from an old set-point level to a new set-point level. In either case, there is a frequency error signal produced by the comparator 4 on the appropriate one of lines 16 and 17.

The output signal on "up" line 16 is also applied to converter 11 where it is arranged to provide an output signal voltage. This output voltage is directly proportional to the input frequency but it is arranged to subtract from the voltage signal from source 13. The resulting signal from junction 14 is a lower magnitude signal than was formerly applied to oscillator 5. This decrease in the oscillator input signal is effective to decrease the frequency of the output signal from oscillator 6. The output signal from comparator 4, accordingly, will decrease in frequency on "up" line 16 to slow down the rate of opening of valve 2. Meanwhile, the output signal from transducer 3 has been increasing in frequency to also decrease the difference frequency of the output signal on the "up" line 16. The decrease in frequency of the signal on line 16 is effective to decrease the output signal from converter 11 and allow the output signal at junction 14 to rise toward the reference signal supplied by source 13, and, thus, increase the oscillator frequency. As the signal from transducer 3 continues to increase, the difference in compared signals continues to decrease and the flow is allowed to increase to the desired level. At the desired level, only the reference signal from source 13 is effective to determine the frequency of oscillator 6 output signal. This frequency is equal to the frequency of the output signal from transducer 3, and the signal on "up" line 16 is terminated.

If a corrective decrease in the flow is indicated by having the frequency of transducer 3 output signal greater than the output signal from oscillator 6, comparator 4 is arranged to produce a difference frequency signal on the "down" line 17. This output signal is applied to motor control 18 to decrease the flow and to converter 12 to produce a directly proportional output signal. The output signal from converter 12 is arranged to add to the signal from source 13. This increase in the signal applied to oscillator 6 is effecive to increase the frequency of the oscillator signal. The increase in the oscillator output signal is effective to decrease the difference signal on "down" line 17 and to decrease the rate of decreasing the flow by valve 2. Since the two input signals to comparator 4 gradually approach each other, as in the case of an increase in the flow, the output signal from comparator 4 decreases to zero frequency and the input signal to amplifier 8 approaches the reference signal supplied by source 13. Thus, in the case of either a desired flow increase or a flow decrease, the apparatus of the present invention is arranged to allow the flow or process change to initially occur at a high rate and subsequently at a decreasing rate until the change is terminated at the set-point level. Accordingly, the process 1 is either stabilized at an old set-point level after a disturbance in either direction from the level or is changed to a new set-point level in accordance with a desired change from the old set-point level.

Referring now to FIG. 2, there is shown a more detailed diagram of the novel digital comparator which is the instant invention and is suitable for use as the comparator 4 shown in FIG. 1. A first input terminal 21 is connected to one input side of flip-flop 22. A suitable signal operates to place the conducting state of the flip-flop on the associated side. A second input terminal 23 is similarly connected to one input side of flip-flop 24. The other input sides of flip-flops 22 and 24 are left unconnected or, alternatively, are connected to a reset signal source. The $\overline{A}$ output side of the flip-flop 22 is connected to the anode electrode of diode 25. The cathode of diode 25 is connected to the input of trigger circuit 26. The output side of trigger circuit 26 is connected to a "reset" circuit for flip-flop 24. The A output of flip-flop 22 is connected along line 27 to one side of coupling capacitor 28 and to one input side (A) of flip-flop 29.

Resistor 30 is connected between line 27 and the input circuit of trigger circuit 31. Diode 50 is connected across resistor 30 with its anode connected to line 27. Trigger capacitor 32 is connected between the input circuit of trigger circuit 31 and ground point 33. An output of trigger circuit 31 is connected to the "reset" circuit of flip-flop 22. The "1" output of trigger circuit 31 is not connected.

The B output side of flip-flop 24 is connected to the input circuit of trigger circuit 26 through resistor 34. The $\overline{B}$ output side of flip-flop 24 is not connected. Diode 35 is connected across resistor 34 with its anode connected to line 36. Line 36 is connected between the B output side of flip-flop 24 and one side of coupling capacitor 37. Line 36 is also connected to one (B) input side of flip-flop 29. Trigger capacitor 38 is connected between the end of resistor 34 which is connected to the input of trigger circuit 26 and ground point 33.

The C output side of flip-flop 29 is connected through resistor 38 to the anode of diode 39 and the other side of capacitor 28. The cathode of diode 39 is connected to output terminal 40. The $\overline{C}$ output side of flip-flop 29 is similarly connected, through a resistor 41, to the anode of diode 42 and the other side of capacitor 37. Diode 42 has the cathode thereof connected to output terminal 43. Output resistor 44 is connected between output terminal 40 and ground point 45 which may be a common point with ground point 33. Output resistor 46 is connected between output terminal 43 and ground point 45.

The circuit shown in FIG. 2 is effective to provide a frequency comparison between two applied frequencies and to produce a frequency error, or difference signal on an appropriate output line. For example, one output line represents a greater frequency by a first signal relative to a second signal and the other output line represents the reverse condition of the compared input signals. Using circuit configuration shown in FIG. 2, the first input signal; e.g., the signal supplied by oscillator 6, is applied to the terminal 23. The second input siganl; e.g., the signal supplied by transducer 3, is applied to input terminal 21. An output signal is produced at output terminal 40 when the frequency of the signal on input terminal 21 is greater than the frequency of the signal on input terminal 23. Conversely an output signal, is produced at output terminal 43 when the frequency of the signal on terminal 23 is greater than the frequency of the signal on terminal 21. Additionally, the comparator circuit 4 is arranged to produce no output signal when the frequencies of the two input signals are equal.

For example, if the input frequencies are equal but not in phase, flip-flop 24 is arranged to be switched by the positive going side of the input signal on terminal 23. Thus, the B output side of flip-flop 24 exhibits a relatively negative signal. Flip-flop 22 either as an initial setting or as a result of a previous cycle, exhibits a relatively positive signal at the A output side thereof and a relatively negative signal at the $\overline{A}$ output side thereof. Diode 25 is biased in a non-conductive condition since the cathode of diode 25 is at the same negative voltage due to the B output signal at flip-flop 24 with respect to the anode of diode 25 which is connected to the $\overline{A}$ output side of flip-flop 22. The non-conductive state of diode 25 allows capacitor 38 to charge through resistor 34 until the stored voltage reaches the threshold voltage of trigger circuit 26. Trigger circuit 26 is, then, energized to produce an output signal by changing state, which change of state is effective to produce an actuating signal for the "reset" circuit of flip-flop 24. The actuating signal resets flip-flop 24 to its original state. This change in the state of flip-flop 24 produces a positive going signal on line 36 which is applied to the B input of flip-flop 29. The signal on line 36 causes flip-flop 29 to assume the state wherein its output C circuit exhibits a relatively negative signal such that diode 39 is nonconductive. Conversely, the $\overline{C}$ side of flip-flop 29 is now at a positive potential, and diode 42 is conductively biased thereby. Thus, diode 42 is conditioned to pass positive signals therethrough. However, before a positive signal is supplied to diode 42, the signal applied to terminal 21 now changes in a positive direction to change state of flip-flop 22 to the state wherein the A output side exhibits a relatively negative signal and the $\overline{A}$ output exhibits a relatively positive signal. This state of flip-flop 22 allows capacitor 32 to charge in a direction which approaches the threshold voltage of trigger circuit 31. When this threshold voltage is reached, trigger circuit 31 changes state. At this time, a signal representing the change of state of trigger circuit 31 is applied to the reset circuit of flip-flop 22 to reset it to its original state. The signal produced by the change in the state of flip-flop 22 is applied along line 27 to the A input of flip-flop 29 to change its state. Thus, the C and C̄ outputs are positive and negative, respectively. Diode 42 is now biased into a nonconducting state and diode 39 is biased into a conducting state by having its anode connected to a positive voltage on the C side of flip-flop 29. Trigger circuits 26 and 31 automatically reset to await further input signals which will be generated as described above. Thus, the cycle of operation for a situation where the frequency of the signals applied to terminals 21 and 23 are equal but not in phase is effective to produce no output signal on either output terminal 40 or 43. That is, one signal at terminal 21 or 23 is required to condition the associated diode 39 or 42 to pass signals therethrough. However, the alternate application of input signals at terminals 21 and 23 effectively alternately "opens" and "closes" the output circuit by reverse biasing output diodes 39 and 42.

Assume now that the input signals are in phase and have the same frequency. In this case, flip-flops 22 and 24 are both triggered into new states at the same time whereby the A and B outputs respectively, each produce a relatively negative signal. These negative signals cannot pass through diodes 39 or 42. Since the anode of diode 25 is connected to output side Ā, it receives a positive potential with respect to the cathode which is connected to line 36 by resistor 34 and diode 25 is conductive. Thus, capacitor 38 cannot charge to the threshold voltage of trigger circuit 26. However, capacitor 32 can charge through resistor 30, as described above, to the threshold voltage of trigger circuit 31. When this state is reached by capacitor 32, trigger circuit 31 changes its state and produces a reset signal for flip-flop 22. Flip-flop 22 is then reset to its original state which is effective to bias diode 25 into a non-conducting state and allow capacitor 38 to charge through resistor 34. When the threshold voltage of trigger circuit 26 is reached, flip-flop 24 is reset to its original state. Since flip-flop 24 must wait until flip-flop 22 is reset, the effect on flip-flop 29 is the same as previously described for out-of-phase input signals of the same frequency and the comparator circuit does not produce any output signal.

Assume now that the frequency of the input signal on input terminal 21 is greater than the frequency of the input signal on input terminal 23. The two initial signals on terminals 21 and 23 have the same effect as the two signals discussed above for the out-of-phase, similar frequency input signals. Thus, flip-flops 22, 24 and 29 are passed through the same change of state cycle. This leaves diode 39 in a conductively biased state. However, the next signal is another signal on terminal 21. This signal is effective to change the state of flip-flop 22. The signal produce by this change is applied through diode 39 to appear across resistor 44 as an output signal on terminal 40. Flip-flop 22 is then reset by trigger circuit 31. Any additional signals on input terminal 21 which occur before another input signal on terminal 23 have a similar effect and appear at output terminal 40.

When an input signal on terminal 23 finally arrives, the cycle of operation for the out-of-phase signals is repeated with the change of state of flip-flop 29. Consequently, diode 39 is reverse biased and diode 42 is forward biased. However, the next input signal which will appear on terminal 21 is used to reset flip-flop 29 to bias diode 39 back into the conducting state. Therefore, this input signal does not appear on output terminal 40. Accordingly, the frequency of the signal appearing on output terminal 40 is the difference in the frequencies of the two applied input signals.

Assume now the frequency of the signals applied to input terminal 23 is greater than the frequency of the signal applied to input terminal 21. Here, again, the cycle of operation with the flip-flops 21 and 23 is repeated except that the flip-flop 29 is now still in the state whereby diode 42 is forward biased. Thus, any further input signals arriving on terminal 23 change the state of flip-flop 24. This change of state produces a signal which appears across resistor 46 as an output signal on output terminal 43 representative of the direction of the input frequency relationship. The arrival of a signal on input terminal 21 is effective to start a new cycle. Thus, the next signal on input terminal 23 is utilized to reset flip-flop 29 and unblock diode 42. Accordingly, the output frequency on terminal 43 is, again, the difference between the frequencies of the applied input signals.

Thus, it may be seen that there has been provided, in accordance with the present invention, a digital control system including a novel comparator for comparing digital signals to provide an error signal representative of a set-point or process variable deviation on the controlled process.

The embodiments of the invention in which an exclusive property or privilege is claimed are defined as follows:

1. A digital signal comparator comprising a first input terminal, a first flip-flop having a first state and a second state and a first state-setting input circuit connected to said first input terminal, means responsive to said first state of said flip-flop to reset said flip-flop to said second state after a predetermined time interval, a second input terminal, a second flip-flop having a first state and a second state and having a first state-setting input circuit connected to said second input terminal, means responsive to said first state of said second flip-flop to reset said second flip-flop to said second state after a predetermined time interval, said last mentioned means including means connected to said second state of said first flip-flop and operative to prevent a reset of said second flip-flop until said first flip-flop is in said first state, a third flip-flop having a first state and a second state, circuit means connecting an output signal from said first state of said first flip-flop to set said third flip-flop in said first state, second circuit means connecting an output signal from said first state of said second flip-flop to set said third flip-flop in said second state, and output circuit means connected to said first states of said first and second flip-flops and arranged to be selectively biased by the states of said third flip-flop to pass a signal from said first flip-flop when said third flip-flop is in said second state and to pass a signal from said second flip-flop when said third flip-flop is in a first state.

2. A signal frequency comparator comprising at least three binary elements, first input means connected to a first one of said binary elements for receiving input signals, second input means connected to a second one of said binary elements for receiving input signals, a third one of said binary elements having one input connected to an output of said first binary element and a further input connected to an output of said second binary element, output means connected to said output of said first and second binary elements to receive signals therefrom in accordance with the condition of said third binary element, and diode means connected between the outputs of said first and second binary elements, respectively, and said output means, the outputs of said third binary elements being connected, respectively, to said diode means to supply bias signals thereto to selectively enable said diode means to conduct signals therethrough from said first and second binary elements.

3. The signal comparator recited in claim 2 wherein said binary elements each comprise flip-flop means, said flip-flop means having two operating states which are controlled by input signals supplied thereto.

4. The signal comparator recited in claim 2 including first and second trigger circuit means, the output of said first trigger circuit means connected to a reset input of said first binary element, the output of said second trigger circuit means connected to a reset input of said second binary element, separate control means connected between the outputs of said first and second trigger circuit means, respectively.

5. The signal comparator circuit recited in claim 4 including means connected between an output means of said first binary element and the control means connected to the input of said second trigger circuit means to inhibit the operation thereof.

6. The signal comparator circuit recited in claim 5 wherein said last named means comprises diode means which is selectively biased by said first binary element to clamp said control means associated with said second trigger circuit means in an inoperative condition.

7. The signal comparator means recited in claim 4 wherein each of said control means include integrating circuit means such that a signal is generated thereby which activates the associated triggers circuit means when a predetermined threshold signal is achieved.

References Cited

UNITED STATES PATENTS

| | | | |
|---|---|---|---|
| 2,971,100 | 2/1961 | Hurst et al. | 328—42 X |
| 2,971,101 | 2/1961 | Hurst et al. | 307—225 X |
| 3,404,343 | 10/1968 | Strand | 328—42 |

JOHN S. HEYMAN, Primary Examiner

U.S. Cl. X.R.

328—61, 141, 207; 340—146.2